(12) United States Patent
Ishikawa

(10) Patent No.: US 8,810,930 B2
(45) Date of Patent: Aug. 19, 2014

(54) PROJECTION LENS, OPTICAL APPARATUS INCLUDING PROJECTION LENS, AND METHOD FOR MANUFACTURING PROJECTION LENS

(75) Inventor: Takahiro Ishikawa, Kawasaki (JP)

(73) Assignee: Nikon Corporation, Tokyo (JP)

( * ) Notice: Subject to any disclaimer, the term of this patent is extended or adjusted under 35 U.S.C. 154(b) by 82 days.

(21) Appl. No.: 13/430,665

(22) Filed: Mar. 26, 2012

(65) Prior Publication Data
US 2012/0275029 A1    Nov. 1, 2012

(30) Foreign Application Priority Data

Mar. 28, 2011    (JP) .................... 2011-069320

(51) Int. Cl.
*G02B 9/14*    (2006.01)
(52) U.S. Cl.
USPC ............................................. 359/785
(58) Field of Classification Search
USPC ................... 359/651, 690, 708, 785
See application file for complete search history.

(56) References Cited

U.S. PATENT DOCUMENTS

| | | | |
|---|---|---|---|
| 4,758,074 A | 7/1988 | Yamakawa | |
| 2003/0184883 A1 | 10/2003 | Sato et al. | |
| 2005/0041306 A1* | 2/2005 | Matsuo ................... | 359/689 |
| 2005/0237633 A1 | 10/2005 | Nagai et al. | |
| 2006/0280498 A1 | 12/2006 | Souma et al. | |
| 2007/0229986 A1 | 10/2007 | Sato et al. | |

FOREIGN PATENT DOCUMENTS

| | | |
|---|---|---|
| JP | 61-249014 A | 11/1986 |
| JP | 01-145614 A | 6/1989 |
| JP | 2003-255222 A | 9/2003 |
| JP | 2005-164839 A | 6/2005 |
| JP | 2005-316010 A | 11/2005 |
| JP | 2006-184385 A | 7/2006 |
| JP | 2006-343554 A | 12/2006 |
| JP | 2007-264182 A | 10/2007 |
| JP | 2007-279697 A | 10/2007 |
| JP | 2010-032636 A | 2/2010 |
| JP | 2010-091883 A | 4/2010 |

OTHER PUBLICATIONS

Extended European Search Report from European Patent Application No. 12161529.8, issued Jul. 5, 2012.

* cited by examiner

*Primary Examiner* — Joseph P Martinez
(74) *Attorney, Agent, or Firm* — Miles & Stockbridge P.C.

(57) ABSTRACT

A projection lens PL comprises, in order from a projection side: a first lens component L1 which has positive refractive power and is biconvex; a second lens component L2 which has negative refractive power and is meniscus; and a third lens component L3 which has positive refractive power and has a convex lens surface facing the projection side, lens surfaces on the projection side and an object side of the first lens component L1 and lens surfaces on the projection side and the object side of the second lens component L2 being aspherical, and the following conditional expression being satisfied:

$$0.2 < f/(-f2) < 0.7$$

where f2 denotes a focal length of the second lens component, and f denotes a focal length of the projection lens.

20 Claims, 8 Drawing Sheets

(EXAMPLE 1)

(EXAMPLE 1)

(EXAMPLE 2)

(EXAMPLE 3)

PROJECTION LENS, OPTICAL APPARATUS INCLUDING PROJECTION LENS, AND METHOD FOR MANUFACTURING PROJECTION LENS

RELATED APPLICATIONS

This invention claims the benefit of Japanese Patent Application No. 2011-069320 which is hereby incorporated by reference.

TECHNICAL FIELD

The present invention relates to a projection lens that is suitable for a projector used for projecting an image, displayed on an image display element or the like, onto a screen, an optical apparatus including this projection lens, and a method for manufacturing the projection lens.

TECHNICAL BACKGROUND

Projector devices that enlarge and project images obtained using image display elements such as liquid crystal display elements and Digital Micro-mirror Devices (DMD™), have been widely used, and various projection lenses for projector devices that can display high definition images have been suggested (e.g. see Japanese Laid-Open Patent Publication No. 2010-32636(A)).

SUMMARY OF THE INVENTION

In recent years, smaller and lighter projector devices have been developed, for which projection lenses used for projector devices must be downsized. Furthermore, lately digital cameras and portable telephones, including projector functions (projection functions), have been turned into practical use, with demand for smaller projection lenses becoming very high accordingly. To meet this demand, a projection lens constituted by a small number of composing lenses, while maintaining performance with correcting various aberrations, is demanded.

With the foregoing in view, it is an object of the present invention to provide a projection lens of which various aberrations are ideally corrected although the optical system is small and short, an optical apparatus including this projection lens, and a method for manufacturing the projection lens.

To achieve this object, a projection lens of the present invention comprises: in order from a projection side: a first lens component which has positive refractive power and is biconvex; a second lens component which has negative refractive power and is meniscus; and a third lens component which has positive refractive power and has a convex lens surface facing the projection side, wherein lens surfaces on the projection side and an object side of the first lens component and lens surfaces on the projection side and the object side of the second lens component are aspherical, and the following conditional expression is satisfied:

$$0.2 < f/(-f2) < 0.7$$

where f2 denotes a focal length of the second lens component, and f denotes a focal length of the projection lens.

In the present invention, "lens component" includes a single lens and a cemented lens.

In the projection lens of the present invention, it is preferable that the following conditional expression is satisfied:

$$1.0 < (R22+R21)/(R22-R21) < 5.0$$

where R21 denotes a paraxial radius of curvature of the projection side lens surface of the second lens component, and R22 denotes a paraxial radius of curvature of the object side lens surface of the second lens component.

In the projection lens of the present invention, it is preferable that the following conditional expression is satisfied:

$$53.0 < vd1 < 61.0$$

where vd1 denotes an Abbe number of the first lens component at d-line.

In the projection lens of the present invention, it is preferable that the following conditional expression is satisfied:

$$1.45 < nd1 < 1.60$$

where nd1 denotes a refractive index of the first lens component at d-line.

In the projection lens of the present invention, it is preferable that the following conditional expression is satisfied:

$$21.0 < vd2 < 35.0$$

where vd2 denotes an Abbe number of the second lens component at d-line.

In the projection lens of the present invention, it is preferable that the following conditional expression is satisfied:

$$1.50 < nd2 < 1.65$$

where nd2 denotes a refractive index of the second lens component at d-line.

In the projection lens of the present invention, it is preferable that an aperture stop is disposed on the projection side of the first lens component.

An optical apparatus of the present invention (e.g. projector 1 according to the present invention) includes the projection lens having the above mentioned configuration.

A method for manufacturing a projection lens according to the present invention is a method for manufacturing a projection lens having a first lens component, a second lens component and a third lens component, the method comprising disposing, in order from a projection side: the first lens component, which has positive refractive power, is biconvex, and of which lens surfaces on the projection side and an object side are aspherical; the second lens component, which has negative refractive power, is meniscus, and of which lens surfaces on the projection side and the object side are aspherical; and the third lens component, which has positive refractive power and has a convex lens surface facing the projection side, wherein the following conditional expression is satisfied:

$$0.2 < f/(-f2) < 0.7$$

where f2 denotes a focal length of the second lens component, and f denotes a focal length of the projection lens.

In the method for manufacturing a projection lens having this configuration, it is preferable that the following conditional expression is satisfied:

$$1.0 < (R22+R21)/(R22-R21) < 5.0$$

where R21 denotes a paraxial radius of curvature of the projection side lens surface of the second lens component, and R22 denotes a paraxial radius of curvature of the object side lens surface of the second lens component.

In the method for manufacturing a projection lens having this configuration, it is preferable that the following conditional expression is satisfied:

$$53.0 < vd1 < 61.0$$

where vd1 denotes an Abbe number of the first lens component at d-line.

In the method for manufacturing a projection lens having this configuration, it is preferable that the following conditional expression is satisfied:

$$1.45 < nd1 < 1.60$$

where nd1 denotes a refractive index of the first lens component at d-line.

According to the present invention, various aberrations are ideally corrected although the optical system is small and short, and high optical performance can be implemented throughout the projection surface.

Further scope of applicability of the present invention will become apparent from the detailed description given hereinafter. However, it should be understood that the detailed description and specific examples, while indicating preferred embodiments of the invention, are given by way of illustration only, since various Changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

DESCRIPTION OF THE EMBODIMENTS

Figure 1:
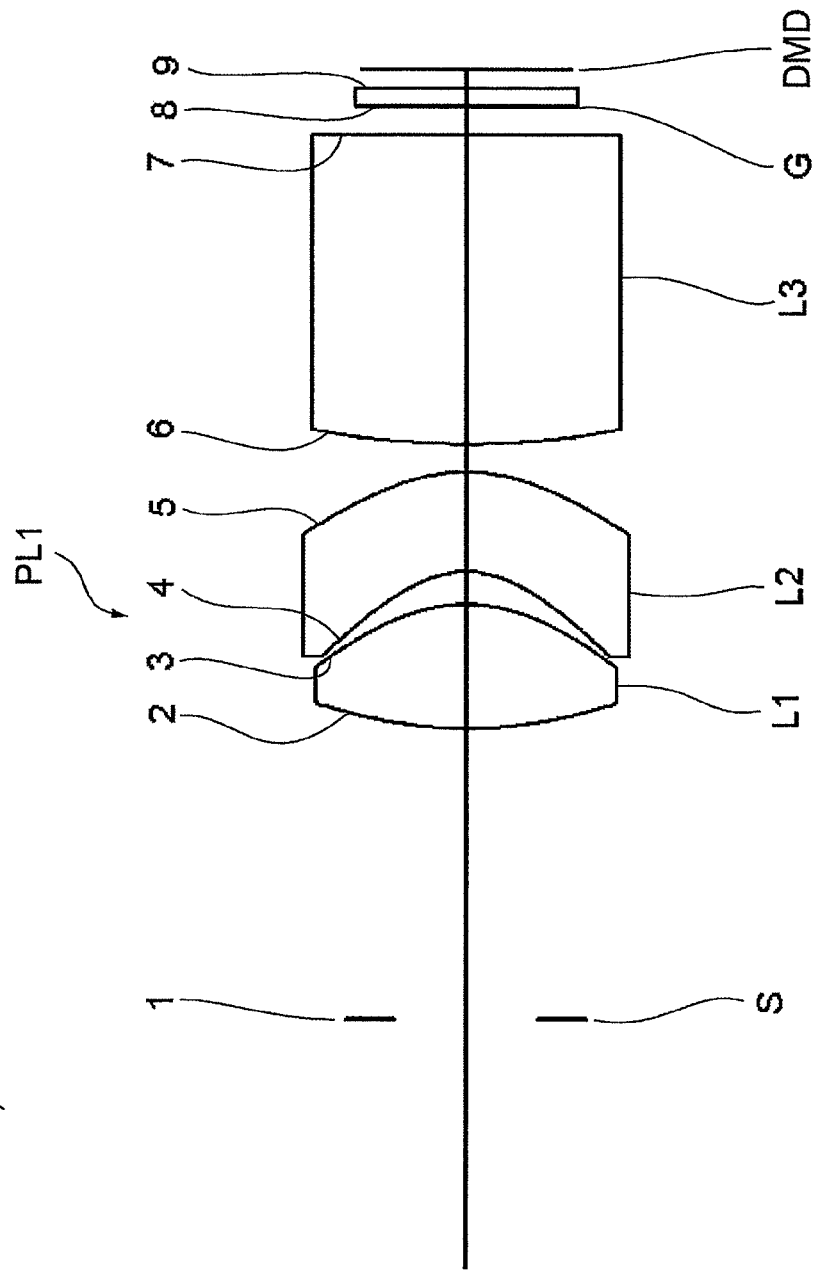
FIG. 1 shows a configuration of a projection lens according to Example 1.

Embodiments of the present invention will now be described with reference to the drawings. As FIG. 1 shows, a projection lens PL according to the present embodiment comprises, in order from a projection side: a first lens component L1 which has positive refractive power and is biconvex; a second lens component L2 which has negative refractive power and is meniscus; and a third lens component L3 which has positive refractive power and has a convex lens surface facing the projection side, and lens surfaces on the projection side and the object side of the first lens component L1 and lens surfaces on the projection side and the object side of the second lens component L2 are aspherical.

Thus the projection lens PL according to the present embodiment can construct the optical system to be small and short, even if the lens surface on the projection side of the third lens component L3 is convex, because various aberrations are substantially corrected by the first lens component L1 and the second lens component L2. Further, chromatic aberration (longitudinal chromatic Aberration and lateral chromatic aberration) can be ideally corrected by combining the first lens component L1 having positive refractive power and the second lens component L2 having negative refractive power.

In this configuration, the projection lens PL of this embodiment satisfies the following conditional expression (1).

$$0.2 < f/(-f2) < 0.7 \tag{1}$$

where f2 denotes a focal length of the second lens component, and f denotes a focal length of the projection lens.

The conditional expression (1) specifies an appropriate ratio of the focal length f of the projection lens PL to the focal length f2 of the second lens component L2. If the upper limit value of the conditional expression (1) is exceeded, it becomes difficult to correct curvature of field, and the refractive power of the second lens component L2 becomes too strong, which increases deterioration of optical performance generated by manufacturing error, and this is not desirable. If the lower limit value of the conditional expression (1) is not reached, on the other hand, it becomes difficult to correct curvature of field, which is not desirable.

To demonstrate the effect of this embodiment, it is preferable that the upper limit value of the conditional expression (1) is 0.60. To demonstrate the effect of this embodiment, it is preferable that the lower limit value of the conditional expression (1) is 0.25.

In the projection lens PL of this embodiment, it is preferable that the following conditional expression (2) is satisfied, where R21 denotes a paraxial radius of curvature of the projection side lend surface of the second lens component L2, and R22 denotes a paraxial radius of curvature of the object side lens surface of the second lens component L2.

$$1.0 < (R22+R21)/(R22-R21) < 5.0 \tag{2}$$

The conditional expression (2) specifies the shapes of the lens surfaces of the second lens component L2. If the upper limit value of the conditional expression (2) is exceeded, it becomes difficult to correct astigmatism, which is not desirable. If the lower limit value of the conditional expression (2) is not reached, on the other hand, the refractive power of the second lens component L2 becomes small, and it becomes difficult to correct astigmatism and distortion. This drops image forming performance around the projection surface, which is not desirable.

To demonstrate the effect of this embodiment, it is preferable that the upper limit value of the conditional expression (2) is 4.5. To demonstrate the effect of this embodiment, it is preferable that the lower limit value of the conditional expression (2) is 3.0.

In the projection lens PL of this embodiment, it is preferable that the following conditional expression (3) is satisfied, where vd1 is an Abbe number of the first lens component L1 at d-line.

$$53.0 < vd1 < 61.0 \tag{3}$$

The conditional expression (3) specifies an appropriate range of an Abbe number vd1 of the first lens component L1. The conditional expression (3) is effective to correct chromatic Aberrations (longitudinal chromatic aberration and lateral chromatic Aberration). If the conditional expression (3) is not satisfied, Chromatic aberration cannot be corrected sufficiently, and implementing high optical performance becomes difficult, which is not desirable.

To demonstrate the effect of this embodiment, it is preferable that the upper limit value of the conditional expression (3) is 59.0. To demonstrate the effect of this embodiment, it is preferable that the lower limit value of the conditional expression (3) is 55.0.

In the projection lens PL of this embodiment, it is preferable that the following conditional expression (4) is satisfied, where nd1 denotes a refractive index of the first lens component L1 at d-line.

$$1.45 < nd1 < 1.60 \tag{4}$$

The conditional expression (4) specifies an appropriate range of the refractive index nd1 of the first lens component L1. If the upper limit value of the conditional expression (4) is exceeded, the range of choices of the lens materials is limited, and it becomes difficult to correct chromatic aberration, which is not desirable. If the lower limit value of the conditional expression (4) is not reached, on the other hand, sufficient magnification and angle of view cannot be guaranteed, and it becomes difficult to correct curvature of field, which is not desirable.

To demonstrate the effect of this embodiment, it is preferable that the upper limit value of the conditional expression (4) is 1.55. To demonstrate the effect of this embodiment, it is preferable that the lower limit value of the conditional expression (4) is 1.50.

In this embodiment, it is preferable that the first lens component L1 is constituted by at least one plastic lens. A plastic lens is formed by molding, such as injection molding, therefore even an aspherical surface can be formed as easily as the case of a spherical surface, and cost is just about the same. Hence if plastic is used for the first lens component L1 which has aspherical surfaces on both lens surfaces, manufacturing cost can be suppressed and the entire lens system can be lighter, compared with the case of using a glass-molded aspherical lens.

In the projection lens PL of this embodiment, it is preferable that the following conditional expression (5) is satisfied, where vd2 denotes an Abbe number of the second lens component L2 at d-line.

$$21.0 < vd2 < 35.0 \tag{5}$$

The conditional expression (5) specifies an appropriate range of an Abbe number vd2 of the second lens component L2. The conditional expression (5) is effective to correct Chromatic aberrations (longitudinal chromatic aberration and lateral chromatic Aberration). If the conditional expression. (5) is not satisfied, chromatic aberration cannot be corrected sufficiently, and implementing high optical performance becomes difficult, which is not desirable.

To demonstrate the effect of this embodiment, it is preferable that the upper limit value of the conditional expression (5) is 33.0. To demonstrate the effect of this embodiment, it is preferable that the lower limit value of the conditional expression (5) is 23.0.

In the projection lens PL of this embodiment, it is preferable that the following conditional expression (6) is satisfied, where nd2 is a refractive index of the second lens component L2 at d-line.

$$1.50 < nd2 < 1.65 \tag{6}$$

The conditional expression (6) specifies an appropriate range of the refractive index nd2 of the second lens component L2. If the upper limit value of the conditional expression (6) is exceeded, the range of choices of the lens materials is limited, and it becomes difficult to correct chromatic aberration, which is not desirable. If the lower limit value of the conditional expression (6) is not reached, on the other hand, sufficient magnification and angle of view cannot be guaranteed, and it becomes difficult to correct curvature of field, which is not desirable.

To demonstrate the effect of this embodiment, it is preferable that the upper limit value of the conditional expression (6) is 1.64. To demonstrate of this embodiment, it is preferable that the lower limit value of the conditional expression (6) is 1.55.

In this embodiment, it is preferable that the second lens component L2 is constituted by at least one plastic lens. A plastic lens is formed by molding, such as injection molding, therefore even an aspherical surface can be formed as easily as the case of spherical surface, and cost is just about the same. Hence if plastic is used for the second lens component L2 which has aspherical surfaces on both lens surfaces, manufacturing cost can be suppressed and the entire lens system can be lighter, compared with the case of using a glass-molded aspherical lens.

In the projection lens PL according to this embodiment, it is preferable that an aperture stop S is disposed on the projection side of the first lens component L1. Because of this configuration, unnecessary light is blocked and coma aberration can be decreased, which is desirable.

Figure 7:
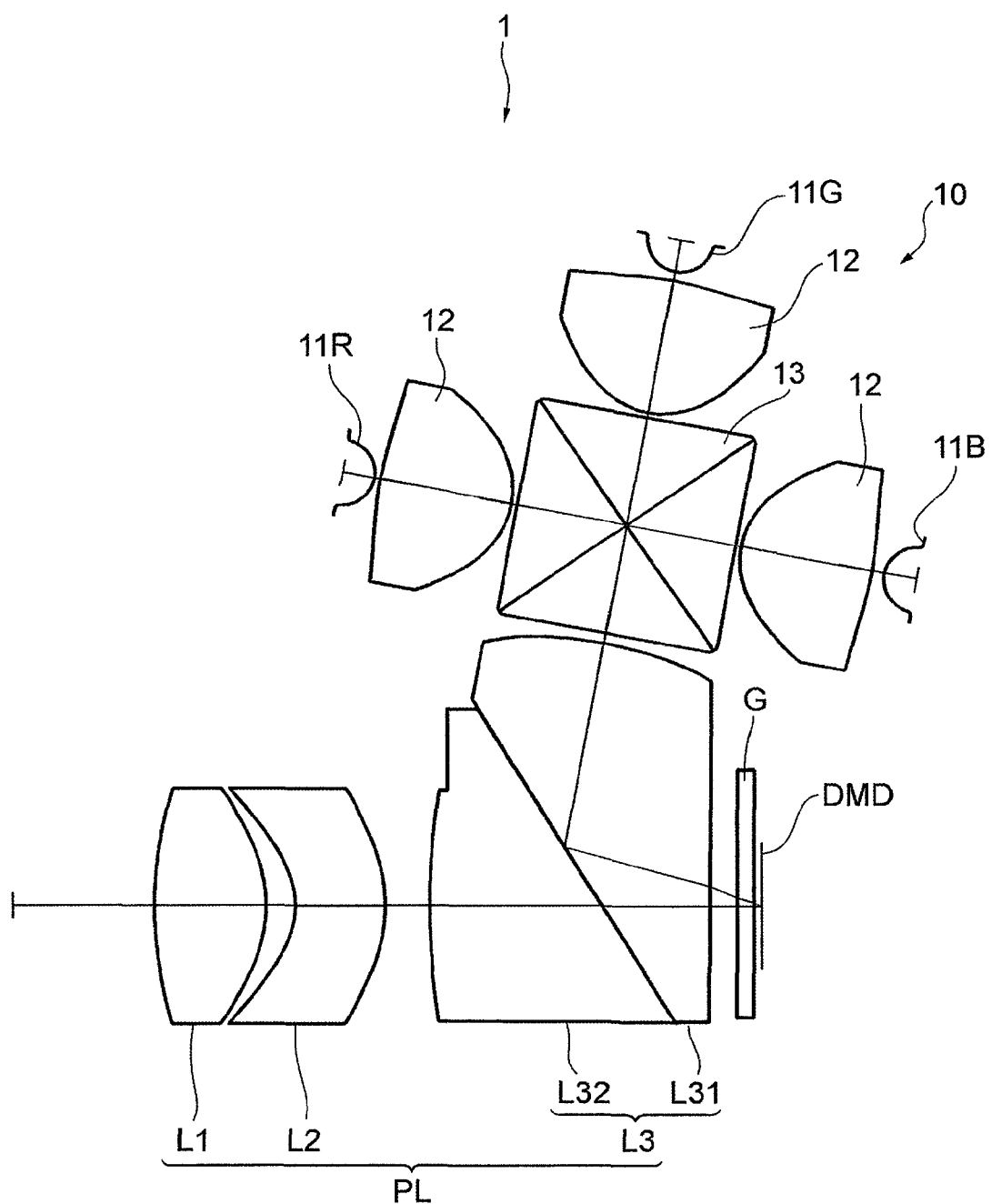
FIG. 7 shows a configuration of a projector (optical apparatus) that includes the projection lens according to this embodiment.

As an optical apparatus including the projection lens PL having the above mentioned configuration, a configuration of a DLP (Digital Light Projector) type projector using DMD for the light bulb is shown in FIG. 7. The projector 1 is included in a digital camera with projector functions, which can project captured images onto a screen or the like.

The projector 1 has a DMD, and an illumination optical system 10 which irradiates illumination light for projection onto the DMD, and a projection lens PL which enlarges and projects the projection light reflected by the DMD onto the screen. In the illumination optical system 10, light emitting diodes (LEDs), which are solid-state light emitting elements, are used for the light sources, and an LED 11R which emits red light, an LED 11G which emits green light, and an LED 11B which emits blue light are arranged around the three surfaces of the cross-dichroic prism 13 via collective lenses 12.

Each luminous flux (red light, green light, blue light) emitted from each LED 11R, 11G and 11B is collected by each of the collective lenses 12, and enters a cross-dichroic prism 13. Each luminous flux is then transmitted through or reflected by the cross-dichroic prism 13, and is emitted and travels to the third lens component L3 of the projection lens PL. Each color light from each LED 11R, 11G and 11B is sequentially irradiated in time division based on emission control by a control unit (not illustrated), and is merged on the same optical axis by the cross-dichroic prism 13, and is emitted.

The third lens component L3 is a prism that has a first prism L31 and a second prism L32. In FIG. 7, the third lens component L3 has a configuration in which the first prism L31 and the second prism L32 are cemented, but may have a configuration in which the first prism L31 and the second prism L32 are not cemented, but are separated with an air space there between. The light which entered from the cross-dichroic prism 13 to the first prism L31 transmits through the first prism L31, and is reflected by the second prism L32, then transmits through the glass cover G, and enters the DMD as an image display element.

The DMD has many micro-mirrors (e.g. micron-sized mirrors) of which reflecting angles can be changed, and each micro-mirror can be independently driven to change the respective inclination angle, based on the drive control (power ON/OFF control) by the control unit (not illustrated). Light which entered the DMD is modulated and reflected according to the inclination angles of the micro-mirrors, and enters the projection lens PL via a glass cover G. Here an image with each color is generated by each color light from the illumination optical system 10 sequentially entering the DMD. The images are enlarged and projected onto the screen via the projection lens PL while being switched sequentially, and as a result color images are displayed.

In this embodiment, DMD was described as the image display element (light bulb) included in the projector, but a transmission type or reflection type liquid crystal display element, either a single panel type or three-panel type, may be used. If a liquid crystal display element is used, the light from the light source need not enter the liquid crystal display element via the third lens component, therefore the third lens component need not have a free-form surface, and can be constituted by a single lens alone.

Figure 8:
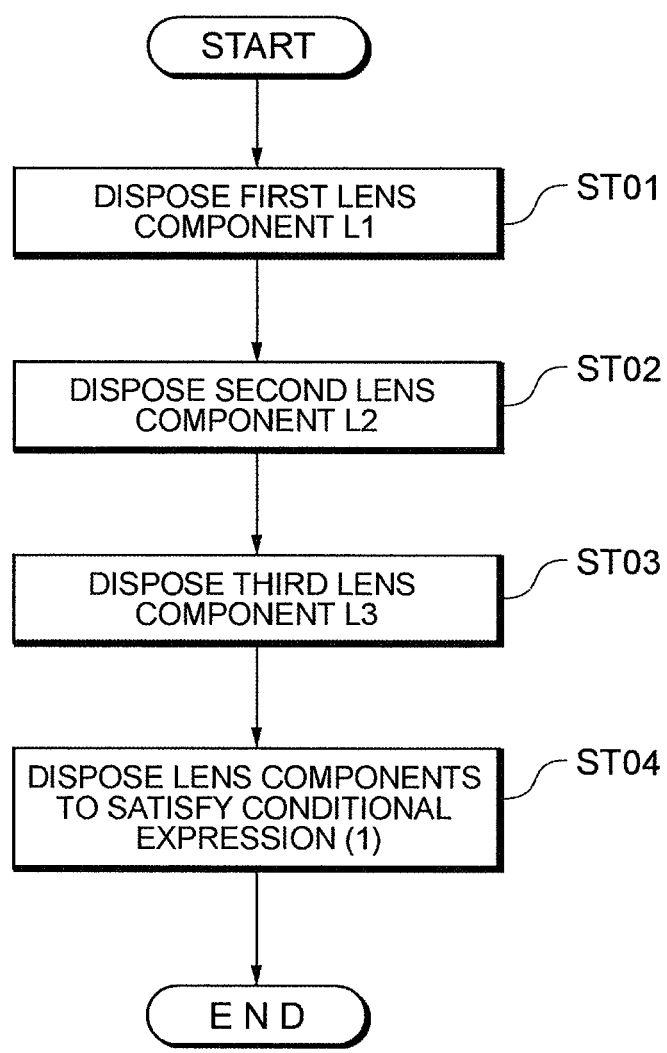
FIG. 8 is a flow chart depicting a method for manufacturing the projection lens according to this embodiment.

A method for manufacturing the projection lens having the first lens component L1, the second lens component L2 and the third lens component L3 will now be described with reference to FIG. 8. First in order from the projection side, the first lens component L1, which has positive refractive power, is biconvex, and of which lens surfaces on the projection side and the object side are aspherical, is disposed in a cylindrical lens barrel (step ST01). Then the second lens component L2, which has negative refractive power, is meniscus, and of which lens surfaces on the projection side and the object side are aspherical, is disposed in the cylindrical lens barrel (step ST02). Then the third lens component L3, which has positive refractive power and has a convex lens surface facing the projection side, is disposed in the cylindrical lens barrel (step ST03). These lens components L1, L2 and L3 are disposed so as to satisfy the following conditional expression (1), $$0.2 < f/(-f2) < 0.7 \tag{1}$$

where f2 denotes a focal length of the second lens component, and f denotes a focal length of the projection lens (step ST04).

EXAMPLES

Each example of the present embodiment will now be described with reference to the drawings. Table 1 to Table 3 list each data on Example 1 to Example 3.

In [Lens Data] in tables, the surface number is the number of the lens surface counted from the projection side (surface number 0, which does not appear in a table, corresponds to the projection surface), r is a radius of curvature of the lens surface, d is a distance to the next lens surface, which is a distance from each optical plane to the next optical plane (or an object surface), on the optical axis, nd is a refractive index at d-line (wavelength: 587.6 nm), and vd is an Abbe number at d-line. "*" attached to a surface number indicates that this lens surface is aspherical, and the radius of curvature r indicates a paraxial radius of curvature. The radius of curvature "0.0000" indicates a plane or an aperture. The refractive index of air is "1.00000" is omitted.

In [Aspherical Data] in tables, the form of an aspherical surface, shown in [Lens Data] is given by the following expression (a), where y denotes a height in a direction perpendicular to the optical axis, X(y) denotes a distance (sag) along the optical axis at height y, r denotes a radius of curvature (paraxial radius of curvature) of the reference spherical surface, κ is a conical coefficient, and An is an aspherical coefficient in degree n. "E-n" indicates "×10$^{-n}$", and "1.234E−05", for example, indicates "1.234×10$^{-5}$".

$$X(y) = (y^2/r)/[1+\{1-\kappa(y^2/r^2)\}^{1/2}] + A4xy^4 + A6xy^6 + A8xy^8 \tag{a}$$

In [Various Data] in tables, f is a focal length of the projection lens PL, FNo is an F number, ω is a half angle of view (unit: degrees), f1 is a focal length of the first lens component L1, and f2 is a focal length of the second lens component L2.

In [Command Expression] in tables, a corresponding value of each conditional expression (1) to (6) is shown.

In all the data values, "mm" is normally used as the unit of focal length f, radius of curvature r, surface distance d and other lengths unless otherwise specified, but unit is not limited to "mm", and another appropriate unit may be used for the data value, since an equivalent optical performance is obtained even if an optical system is proportionally expanded or proportionally reduced.

Since the description on a table thus far is common for all the examples, this description is omitted herein below.

Example 1

Example 1 will now be described with reference to FIG. 1, FIG. 2 and Table 1. A projection lens PL (PL1) according to Example 1 comprises in order from the projection side to the object side (image display element side): a first lens component L1 which has positive reformative power and is biconvex; a second lens component L2 which has negative refractive power and is meniscus; and a third lens component L3 which has positive refractive power and has a convex lens surface facing the projection side, and lens surfaces on the projection side and the object side of the first lens component L1 and lens surfaces on the projection side and the object side of the second lens component L2 are aspherical.

The first lens component L1 is a biconvex positive lens where lens surfaces on the projection side and the object side are aspherical. The second lens component L2 is a negative meniscus lens having a concave surface facing the projection side. The third lens component L3 is a prism of which convex surface faces the projection side and plane faces the object side. It is preferable that the first lens component L1 and the second lens component L2 are plastic aspherical lenses. It is preferable that the third lens component L3 is constituted by a plane (including an inclined plane) in an area other than the lens surface having a convex surface facing the projection side (surface number 6). It is particularly preferable that the lens surface facing the object (surface number 7) is a plane.

An aperture stop S is disposed on the projection side of the first lens component L1, in order to cut off harmful light. A DMD, as an image display element (light bulb), is disposed on the object side of the third lens component L3, and a cover glass G, which is a plane-parallel plate, is disposed immediately before the DMD.

Table 1 shows each data of Example 1. The surface numbers 1 to 9 in Table 1 correspond to surfaces 1 to 9 in FIG. 1. In Example 1, the lens surfaces of surface 2, surface 3, surface 4 and surface 5 are formed to be aspherical respectively.

TABLE 1

[Lens Data]

| surface number | r | d | nd | vd |
|---|---|---|---|---|
| 1 | 0.00000 | 11.12000 | (Aperture Stop) | |
| *2 | 13.49904 | 4.34000 | 1.528600 | 55.88 |
| *3 | −5.27552 | 1.15000 | | |
| *4 | −3.09327 | 3.50000 | 1.617870 | 24.59 |
| *5 | −5.67922 | 0.81550 | | |
| 6 | 27.96885 | 10.78000 | 1.528600 | 55.88 |
| 7 | 0.00000 | 1.00000 | | |
| 8 | 0.00000 | 0.65000 | 1.506872 | 65.11 |
| 9 | 0.00000 | 0.72790 | | |

TABLE 1-continued

[Aspherical Data]

surface 2

κ = −5.0935, A4 = 2.48850E−05, A6 = 0.00000E+00,
A8 = 0.00000E+00 surface 3

κ = −2.4376, A4 = −9.41740E−04, A6 = 1.45600E−05,
A8 = 0.00000E+00 surface 4

κ = −1.0232, A4 = −6.63520E−04, A6 = 1.31510E−05,
A8 = 0.00000E+00 surface 5

κ = −1.5717, A4 = −3.70320E−05, A6 = −1.81930E−07,
A8 = 0.00000E+00

[Various Data]

f = 12.61476
Fno = 2.5
ω = 13.93578
f1 = 7.80005
f2 = −22.75861
f3 = 52.91119

[Conditional Expressions]

| Conditional Expression (1) | f/(−f2) = 0.55428 |
| Conditional Expression (2) | (R22 + R21)/(R22 − R21) = 3.39236 |
| Conditional Expression (3) | vd1 = 55.88 |
| Conditional Expression (4) | nd1 = 1.52860 |
| Conditional Expression (5) | vd2 = 24.59 |
| Conditional Expression (6) | nd2 = 1.61787 |

As the data in Table 1 shows, the projection lens PL1 of this example satisfies all the conditional expressions (1) to (6).

Figure 2:
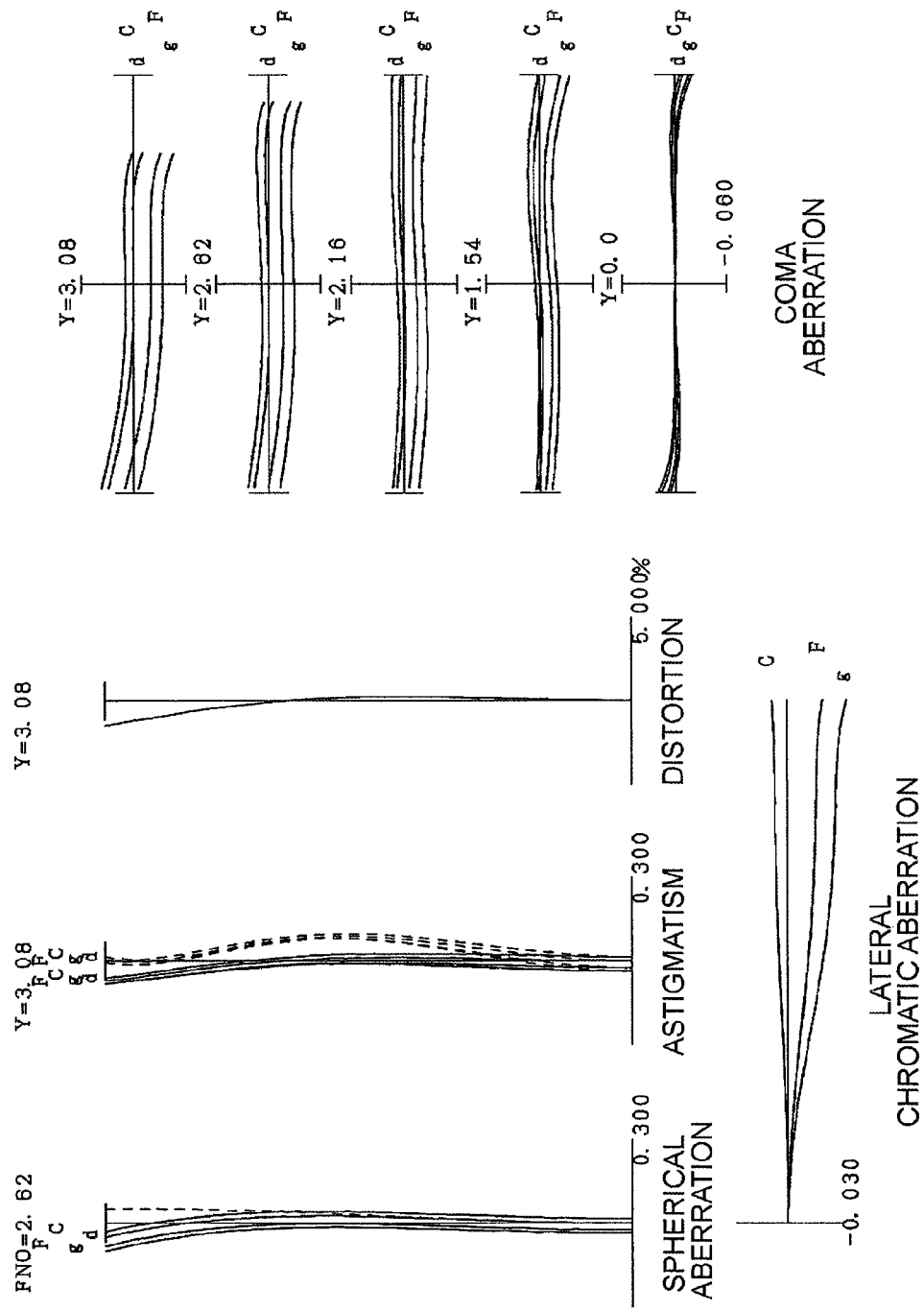
FIG. 2 are graphs showing various aberrations of the projection lens according to Example 1.

FIG. 2 are graphs showing various aberrations (specifically: spherical aberration, astigmatism, distortion, lateral Chromatic aberration, coma aberration) of the projection lens PL1 according to Example 1. In each graph showing aberrations, FNO is an F number, and Y is an object height (image height of image display element). d indicates various aberrations at d-line (wavelength: 587.6 nm), g indicates various aberrations at g-line (wavelength: 435.8 nm), C indicates various aberrations at C-line (wavelength: 656.3 nm), F indicates various aberrations at F-line (wavelength: 486.1 nm), and no indication indicates various aberrations at d-line. In graphs showing astigmatism, the solid line indicates the sagittal image surface, and the broken line indicates the meridional image surface. In graphs showing coma aberration, the solid line indicates a meridional coma aberration at d-line, C-line, g-line and F-line at each incident light. The description on the graphs showing aberrations is the same for the other examples, and is therefore omitted for the other examples.

As each graph showing aberrations clarifies, in the projection lens according to Example 1, various aberrations are ideally corrected although the optical system is small and short, and excellent optical performance, including image forming performance, is implemented.

Example 2

Figure 3:
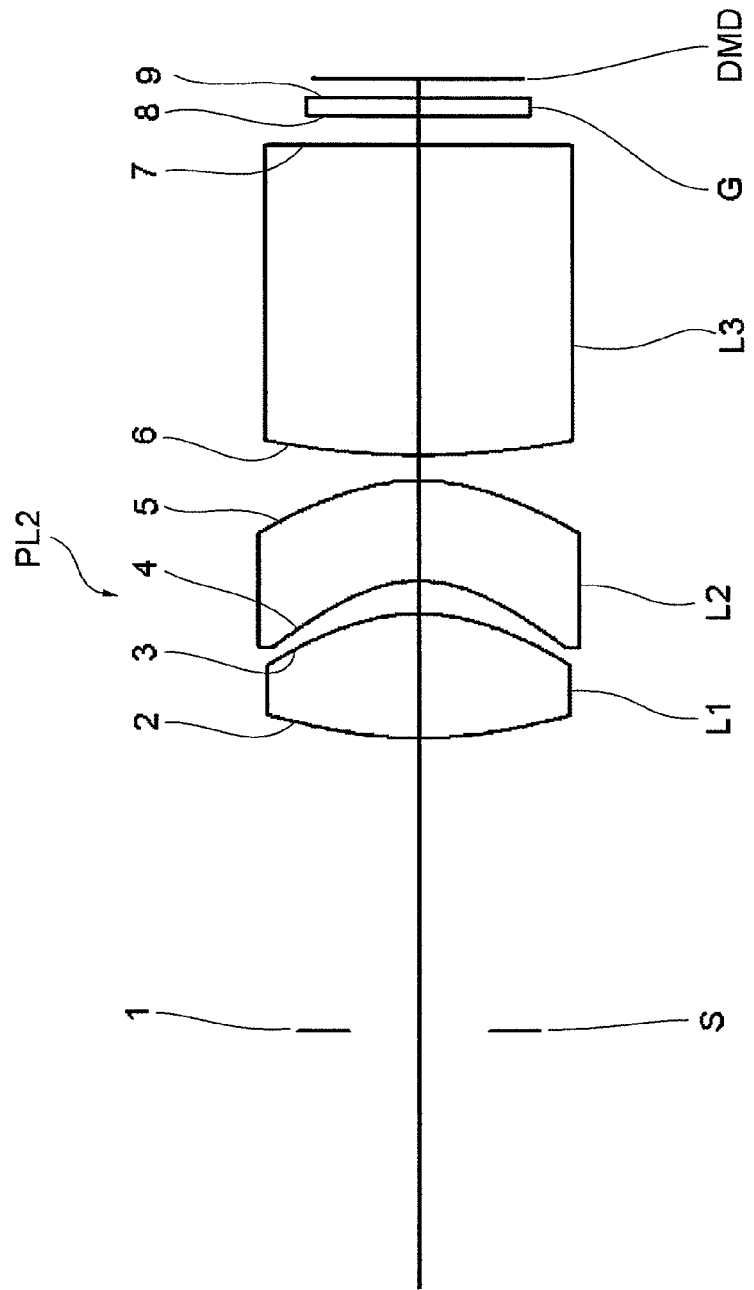
FIG. 3 shows a configuration of a projection lens according to Example 2.

Example 2 will now be described with reference to FIG. 3, FIG. 4 and Table 2. A projection lens PL (PL2) according to Example 2 comprises in order from the projection side to the object side (image display element side): a first lens component L1 which has positive reformative power and is biconvex; a second lens component L2 which has negative refractive power and is meniscus; and a third lens component L3 which has positive refractive power and has a convex lens surface facing the projection side, and lens surfaces on the projection side and the object side of the first lens component L1 and lens surfaces on the projection side and the object side of the second lens component L2 are aspherical.

The first lens component L1 is a biconvex positive lens where lens surfaces on the projection side and the object side are aspherical. The second lens component L2 is a negative meniscus lens having a concave surface facing the projection side. The third lens component L3 is a prism of which convex surface faces the projection side and plane faces the object side. It is preferable that the first lens component L1 and the second lens component L2 are plastic aspherical lenses. It is preferable that the third lens component L3 is constituted by a plane (including an inclined plane) in an area other than the lens surface having a convex surface facing the projection side (surface number 6). It is particularly preferable that the lens surface facing the object (surface number 7) is a plane.

An aperture stop S is disposed on the projection side of the first lens component L1, in order to cut off harmful light. A DMD, as an image display element (light bulb), is disposed on the object side of the third lens component L3, and a cover glass G, which is a plane-parallel plate, is disposed immediately before the DMD.

Table 2 shows each data of Example 2. The surface numbers 1 to 9 in Table 2 correspond to surfaces 1 to 9 in FIG. 3. In Example 2, the lens surfaces of surface 2, surface 3, surface 4 and surface 5 are formed to be aspherical respectively.

TABLE 2

[Lens Data]

| surface number | r | d | nd | vd |
|---|---|---|---|---|
| 1 | 0.00000 | 11.03000 | (Aperture Stop) | |
| *2 | 14.67555 | 4.34000 | 1.528600 | 55.88 |
| *3 | −6.70508 | 1.15000 | | |
| *4 | −4.29812 | 3.50000 | 1.617870 | 24.59 |
| *5 | −6.92149 | 0.81550 | | |
| 6 | 27.96885 | 10.78000 | 1.528600 | 55.88 |
| 7 | 0.00000 | 1.00000 | | |
| 8 | 0.00000 | 0.65000 | 1.506872 | 65.11 |
| 9 | 0.00000 | 0.73343 | | |

[Aspherical Data]

surface 2

κ = −22.3724, A4 = 5.91251E−04, A6 = −2.05070E−05,
A8 = 2.35364E−07 surface 3

κ = −2.4210, A4 = −2.73382E−05, A6 = −6.68879E−06,
A8 = 1.18518E−07 surface 4

κ = −3.3882, A4 = −1.47853E−03, A6 = 5.43977E−05,
A8 = −8.01390E−07 surface 5

κ = −6.4934, A4 = −1.01339E−03, A6 = −2.94836E−05,
A8 = −3.70690E−07

[Various Data]

f = 12.61393
Fno = 2.60618
ω = 13.90518
f1 = 9.36475

TABLE 2-continued f2 = −37.42004
f3 = 52.91119

[Conditional Expressions]

| Conditional Expression (1) | f/(−f2) = 0.3370902 |
| Conditional Expression (2) | (R22 + R21)/(R22 − R21) = 4.27679 |
| Conditional Expression (3) | vd1 = 55.88 |
| Conditional Expression (4) | nd1 = 1.52860 |
| Conditional Expression (5) | vd2 = 24.59 |
| Conditional Expression (6) | nd2 = 1.61787 |

As the data in Table 2 shows, the projection lens PL2 of this example satisfies all the conditional expressions (1) to (6).

Figure 4:
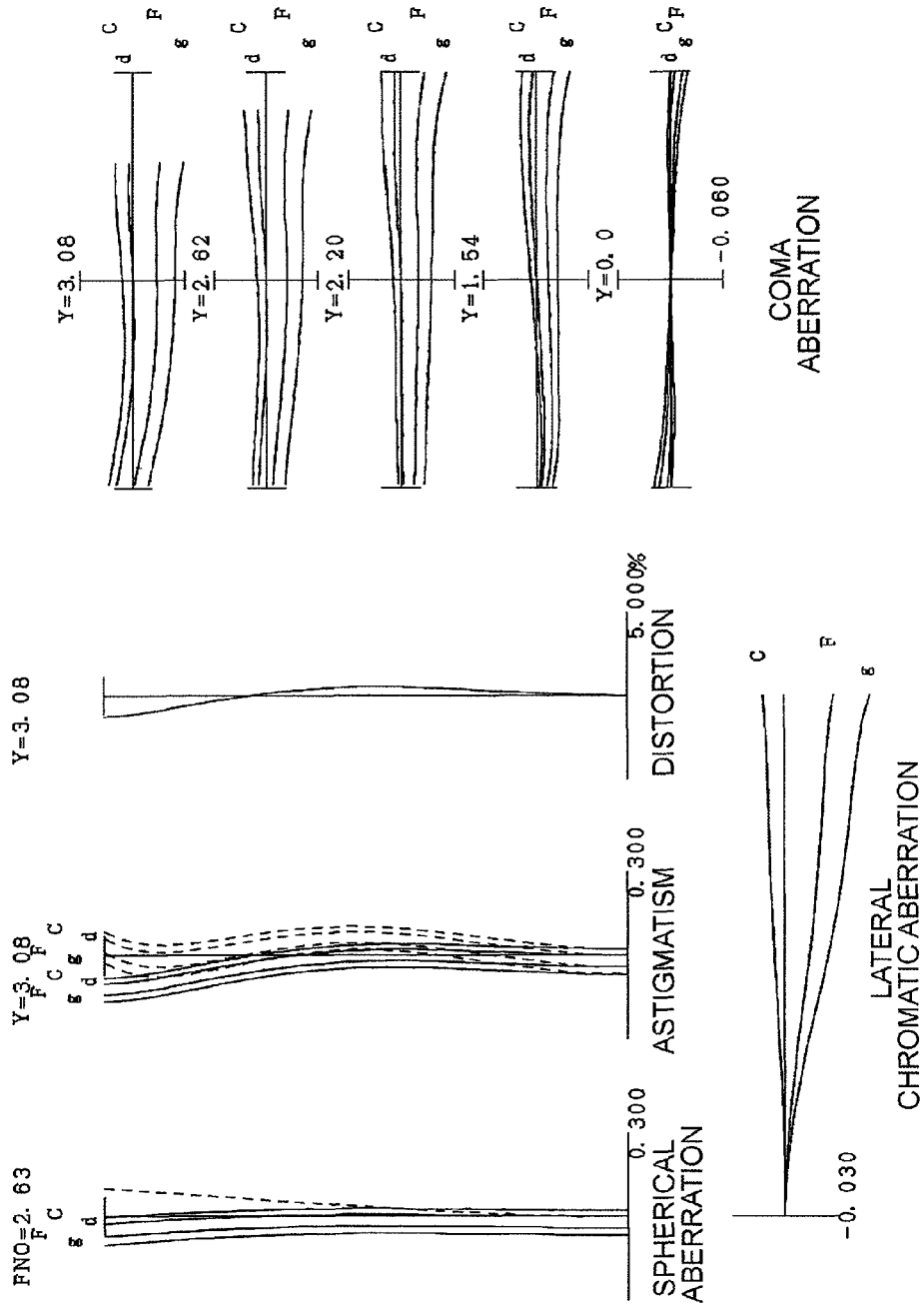
FIG. 4 are graphs showing various aberrations of the projection lens according to Example 2.

FIG. 4 are graphs showing various aberrations (specifically: spherical aberration, astigmatism, distortion, lateral Chromatic aberration, coma aberration) of the projection lens PL2 according to Example 2.

As each graph showing aberrations clarifies, in the projection lens according to Example 2, various aberrations are ideally corrected although the optical system is small and short, and excellent optical performance, including image forming performance, is implemented.

Example 3

Figure 5:
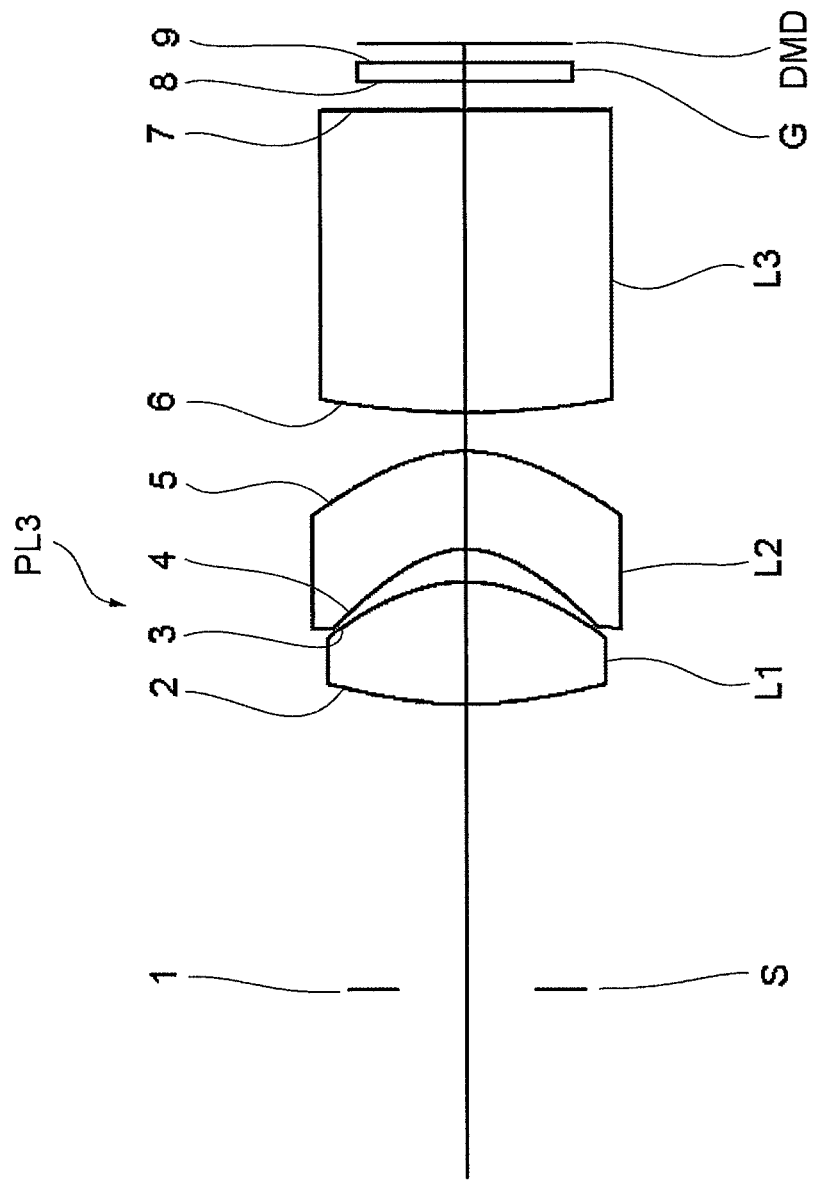
FIG. 5 shows a configuration of a projection lens according to Example 3.

Example 3 will now be described with reference to FIG. 5, FIG. 6 and Table 3. A projection lens PL (PL3) according to Example 3 comprises in order from the projection side to the object side (image display element side): a first lens component L1 which has positive reformative power and is biconvex; a second lens component L2 which has negative refractive power and is meniscus; and a third lens component L3 which has positive refractive power and has a convex lens surface facing the projection side, and lens surfaces on the projection side and the object side of the first lens component L1 and lens surfaces on the projection side and the object side of the second lens component L2 are aspherical.

The first lens component L1 is a biconvex positive lens where lens surfaces on the projection side and the object side are aspherical. The second lens component L2 is a negative meniscus lens having a concave surface facing the projection side. The third lens component L3 is a prism of which convex surface faces the projection side and plane faces the object side. It is preferable that the first lens component L1 and the second lens component L2 are plastic aspherical lenses. It is preferable that the third lens component L3 is constituted by a plane (including an inclined plane) in an area other than the lens surface having a convex surface facing the projection side (surface number 6). It is particularly preferable that the lens surface facing the object (surface number 7) is a plane.

An aperture stop S is disposed on the projection side of the first lens component L1, in order to cut off harmful light. A DMD, as an image display element (light bulb), is disposed on the object side of the third lens component L3, and a cover glass G, which is a plane-parallel plate, is disposed immediately before the DMD.

Table 3 shows each data of Example 3. The surface numbers 1 to 9 in Table 3 correspond to surfaces 1 to 9 in FIG. 5. In Example 3, the lens surfaces of surface 2, surface 3, surface 4 and surface 5 are formed to be aspherical respectively.

TABLE 3

[Lens Data]

| surface number | r | d | nd | vd |
|---|---|---|---|---|
| 1 | 0.00000 | 11.11000 | (Aperture Stop) | |
| *2 | 14.37595 | 4.34500 | 1.528600 | 55.88 |
| *3 | −5.37045 | 1.17000 | | |
| *4 | −3.04891 | 3.50000 | 1.617870 | 24.59 |
| *5 | −5.36181 | 1.28915 | | |
| 6 | 27.96885 | 10.78000 | 1.528600 | 55.88 |
| 7 | 0.00000 | 1.00000 | | |
| 8 | 0.00000 | 0.65000 | 1.506872 | 65.11 |
| 9 | 0.00000 | 0.73316 | | |

[Aspherical Data]

surface 2

κ = −5.0000, A4 = −4.41060E−05, A6 = 0.00000E+00,
A8 = 0.00000E+00 surface 3

κ = −3.0447, A4 = −7.52120E−04, A6 = 9.72130E−06,
A8 = 0.00000E+00 surface 4

κ = −1.6946, A4 = −2.28350E−04, A6 = 4.31050E−06,
A8 = 0.00000E+00 surface 5

κ = −0.9727, A4 = −7.31470E−04, A6 = −5.62900E−06,
A8 = 0.00000E+00

[Various Data]

f = 12.61674
Fno = 2.60618
ω = 13.90518
f1 = 8.00576
f2 = −26.98640
f3 = 52.91119

[Conditional Expressions]

| Conditional Expression (1) | f/(−f2) = 0.46752 |
| Conditional Expression (2) | (R22 + R21)/(R22 − R21) = 3.636439 |
| Conditional Expression (3) | vd1 = 55.88 |
| Conditional Expression (4) | nd1 = 1.52860 |
| Conditional Expression (5) | vd2 = 23.77 |
| Conditional Expression (6) | nd2 = 1.63710 |

As the data in Table 3 shows, the projection lens PL3 of this example satisfies all the conditional expressions (1) to (6).

Figure 6:
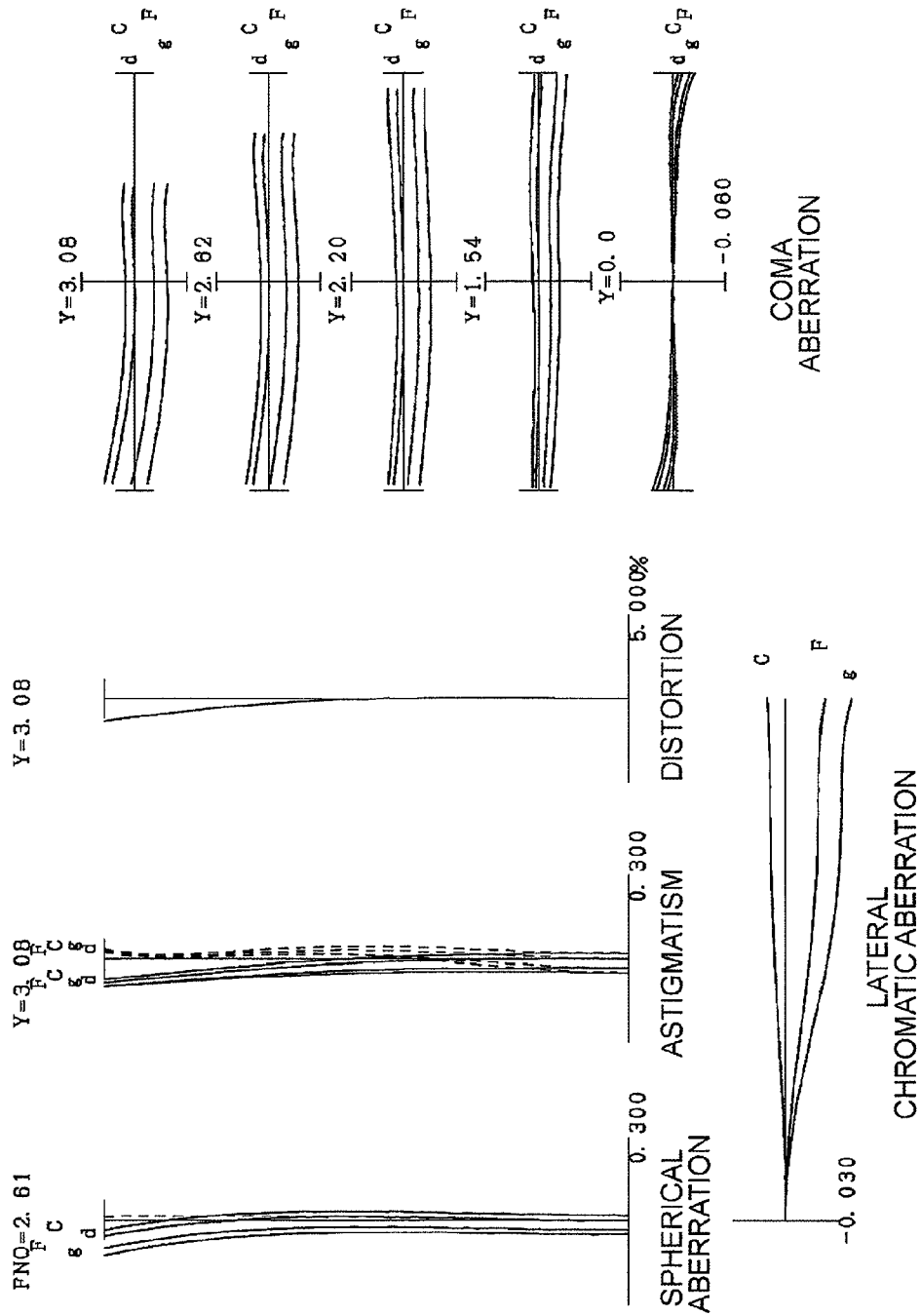
FIG. 6 are graphs showing various aberrations of the projection lens according to Example 3.

FIG. 6 are graphs showing various aberrations (specifically: spherical aberration, astigmatism, distortion, lateral Chromatic aberration, coma aberration) of the projection lens PL3 according to Example 3.

As each graph showing aberrations clarifies, in the projection lens according to Example 3, various aberrations are ideally corrected although the optical system is small and short, and excellent optical performance, including image forming performance, is implemented.

In the above embodiment, the following content can be adopted within a range where the optical performance is not diminished.

In each example, the projection lens composed of three lens components was shown, but the present invention can also be applied to a configuration using a different number of lens components, such as four or five. In the configuration, a lens component or a lens group may be added to the side closest to the object, or a lens component or a lens group may be added to the side closest to the image. A "lens group" refers to a portion having at least one lens, isolated by an air space which changes upon zooming.

In this embodiment, a single or a plurality of lens component(s), a partial lens component or the entire lens system may be designed to be a focusing lens, which performs focusing from an object at infinity to an object at a short distance by moving in the optical axis direction. This focusing lens can be applied to auto focus, and is also suitable for driving a motor for auto focusing (driving using an ultrasonic motor). It is particularly preferable that the entire lens system is designed to be the focusing lens.

In this embodiment, a lens component or a partial lens component may be designed to be a vibration-isolating lens component, which corrects image blurs generated by hand motion by moving the lens component or the partial lens component in a direction perpendicular to the optical axis or rotating (oscillating) the lens component or the partial lens component in an in-plane direction including the optical axis.

In this embodiment, the lens surface may be formed to be a spherical surface or a plane, or an aspherical surface. If the lens surface is a spherical surface or a plane, lens processing, assembly and adjustment are easy, and deterioration of optical performance, due to an error in processing, assembly and adjustment, can be prevented. Even if the image plane is shifted, the drawing performance is not affected very much, which is desirable. If the lens surface is an aspherical surface, the aspherical surface can be any aspherical surface generated by grinding, a glass molded aspherical surface generated by forming glass in an aspherical shape using a die, and a composite aspherical surface generated by forming resin on the surface of the glass to be an aspherical shape. The lens surface may be a diffraction surface, and the lens may be a refractive index distributed lens (GRIN lens) or a plastic lens.

In this embodiment, it is preferable that the first lens component and the second lens component are plastic lenses, but one or both of the first and second lens components may be glass lens(es).

In this embodiment, it is preferable that the aperture stop is disposed on the projection side of the first lens component, but if lights emitted from the image display element converge in a predetermined angle range, and enter the projection lens, the aperture stop may be omitted or shifted to the first lens component side, which is desirable since the optical system becomes even shorter.

In this embodiment, each lens surface may be coated with an anti-reflection film which has high transmittance in a wide wavelength region, in order to decrease flares and ghosts, and implement a high optical performance with high contrast.

In this embodiment, the first lens component is a single lens, but may be a cemented lens in which a plurality of lenses are cemented.

In this embodiment, the second lens component is a single lens, but may be a cemented lens in which a plurality of lenses are cemented.

To assist understanding the present invention, the invention has been described with reference to the configuration requirements of the embodiment, but it goes without saying that the present invention is not limited to this.

As described above, the present invention can provide a projection lens suitable for projectors. According to the present invention, various aberrations are ideally corrected although the optical system is small and short, and high optical performance can be implemented throughout the projection surface.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A projection lens comprising, in order from a projection side: a first lens component which has positive refractive power and is biconvex; a second lens component which has negative refractive power and is meniscus; and a third lens component which has positive refractive power and has a convex lens surface facing the projection side, lens surfaces on the projection side and an object side of the first lens component and lens surfaces on the projection side and the object side of the second lens component being aspherical, at least one of a projection side surface and an object side surface of the third lens component being spherical or flat, and the following conditional expression being satisfied:

$$0.2 < f/(-f2) < 0.7$$

where f2 denotes a focal length of the second lens component, and f denotes a focal length of the projection lens.

2. The projection lens according to claim 1, wherein the following conditional expression is satisfied:

$$1.0 < (R22+R21)/(R22-R21) < 5.0$$

where R21 denotes a paraxial radius of curvature of the projection side lens surface of the second lens component, and R22 denotes a paraxial radius of curvature of the object side lens surface of the second lens component.

3. The projection lens according to claim 1, wherein the following conditional expression is satisfied:

$$53.0 < vd1 < 61.0$$

where vd1 denotes an Abbe number of the first lens component at d-line.

4. The projection lens according to claim 1, wherein the following conditional expression is satisfied:

$$1.45 < nd1 < 1.60$$

where nd1 denotes a refractive index of the first lens component at d-line.

5. The projection lens according to claim 1, wherein the following conditional expression is satisfied:

$$21.0 < vd2 < 35.0$$

where vd2 denotes an Abbe number of the second lens component at d-line.

6. The projection lens according to claim 1, wherein the following conditional expression is satisfied:

$$1.50 < nd2 < 1.65$$

where nd2 denotes a refractive index of the second lens component at d-line.

7. The projection lens according to claim 1, wherein an aperture stop is disposed on the projection side of the first lens component.

8. An optical apparatus including the projection lens according to claim 1.

9. A method for manufacturing a projection lens having a first lens component, a second lens component and a third lens component, the method comprising disposing, in order from a projection side:

the first lens component, which has positive refractive power, is biconvex, and of which lens surfaces on the projection side and an object side are aspherical;

the second lens component, which has negative refractive power, is meniscus, and of which lens surfaces on the projection side and the object side are aspherical; and the third lens component, which has positive refractive power, has a convex lens surface facing the projection side, and of which at least one of lens surfaces on the projection side and the object side is spherical or flat, and the following conditional expression being satisfied:

$$0.2 < f/(-f2) < 0.7$$

where f2 denotes a focal length of the second lens component, and f denotes a focal length of the projection lens.

10. The method for manufacturing a projection lens according to claim 9, wherein the following conditional expression is satisfied:

$$1.0 < (R22+R21)/(R22-R21) < 5.0$$

where R21 denotes a paraxial radius of curvature of the projection side lens surface of the second lens component, and R22 denotes a paraxial radius of curvature of the object side lens surface of the second lens component.

11. The method for manufacturing a projection lens according to claim 9, wherein the following conditional expression is satisfied:

$$53.0 < vd1 < 61.0$$

where vd1 denotes an Abbe number of the first lens component at d-line.

12. The method for manufacturing a projection lens according to claim 9, wherein the following conditional expression is satisfied:

$$1.45 < nd1 < 1.60$$

where nd1 denotes a refractive index of the first lens component at d-line.

13. A projection lens comprising, in order from a projection side: a first lens component which has positive refractive power and is biconvex; a second lens component which has negative refractive power and is meniscus; and a third lens component which has positive refractive power and has a convex lens surface facing the projection side, lens surfaces on the projection side and an object side of the first lens component and lens surfaces on the projection side and the object side of the second lens component being aspherical, and the following conditional expressions being satisfied:

$$0.2 < f/(-f2) < 0.7$$

$$1.0 < (R22+R21)/(R22-R21) < 4.27697$$

where f2 denotes a focal length of the second lens component, f denotes a focal length of the projection lens, R21 denotes a paraxial radius of curvature of the projection side lens surface of the second lens component, and R22 denotes a paraxial radius of curvature of the object side lens surface of the second lens component.

14. A projection lens according to claim 13, wherein the following conditional expression is satisfied:

$$1.45 < nd1 < 1.60$$

where nd1 denotes a refractive index of the first lens component at d-line.

15. A projection lens according to claim 13, wherein the following conditional expression is satisfied:

$$21.0 < vd2 < 35.0$$

where vd2 denotes an Abbe number of the second lens component at d-line.

16. An optical apparatus including a projection lens, the projection lens comprising, in order from a projection side: a first lens component which has positive refractive power and is biconvex; a second lens component which has negative refractive power and is meniscus; and a third lens component which has positive refractive power and has a convex lens surface facing the projection side, lens surfaces on the projection side and an object side of the first lens component and lens surfaces on the projection side and the object side of the second lens component being aspherical, and the following conditional expression being satisfied:

$$0.2 < f/(-f2) < 0.7$$

where f2 denotes a focal length of the second lens component, and f denotes a focal length of the projection lens, the optical apparatus further including an image display element, an object side surface of the third lens component facing the image display element.

17. An optical apparatus according to claim 16, wherein at least one of a projection side surface and the object side surface of the third lens component is spherical or flat.

18. An optical apparatus according to claim 16, wherein the following conditional expression is satisfied:

$$1.45 < nd1 < 1.60$$

where nd1 denotes a refractive index of the first lens component at d-line.

19. An optical apparatus according to claim 16, wherein the following conditional expression is satisfied:

$$21.0 < vd2 < 35.0$$

where vd2 denotes an Abbe number of the second lens component at d-line.

20. An optical apparatus according to claim 16, wherein the following conditional expression is satisfied:

$$1.0 < (R22+R21)/(R22-R21) < 5.0$$

where R21 denotes a paraxial radius of curvature of the projection side lens surface of the second lens component, and R22 denotes a paraxial radius of curvature of the object side lens surface of the second lens component.

* * * * *